US006277450B1

(12) United States Patent
Katoot et al.

(10) Patent No.: US 6,277,450 B1
(45) Date of Patent: Aug. 21, 2001

(54) METHOD AND COMPOSITION FOR PREVENTING CORROSION

(76) Inventors: Mohammad W. Katoot, deceased, late of Roswell, GA (US); by Karen Robbyn Goodan Katoot, legal representative, 1080 Laurian Park Dr., Rosewell, GA (US) 30075; by Ali Maroof Katoot, legal representative, 2841 Cory Ct. SW., Apt 1, Cedar Rapids, IA (US) 52404; by Ahmed Maroof Katoot, legal representative, Lulworth La., Lawrenceville, GA (US) 30044

( * ) Notice: Subject to any disclaimer, the term of this patent is extended or adjusted under 35 U.S.C. 154(b) by 0 days.

(21) Appl. No.: 09/234,850

(22) Filed: Jan. 22, 1999

Related U.S. Application Data

(60) Provisional application No. 60/072,625, filed on Jan. 26, 1998.

(51) Int. Cl.[7] .................................. C08F 2/48; C08J 7/18

(52) U.S. Cl. .......................... 427/512; 427/508; 427/492; 427/517; 427/551; 427/553; 427/595; 427/384; 427/385.5; 522/6; 522/71; 522/81; 522/86; 522/24; 522/111; 522/114; 522/120; 522/128; 522/116

(58) Field of Search .................................... 522/111, 114, 522/120, 128, 116, 86, 6, 24, 60, 71, 81; 427/492, 508, 512, 517, 551, 553, 521, 595, 384, 385.5

(56) References Cited

U.S. PATENT DOCUMENTS 5,376,400 * 12/1994 Goldberg et al. .................. 427/2.24
5,932,299 * 8/1999 Katoot .................................. 427/508

FOREIGN PATENT DOCUMENTS 714 417 B1 * 6/1998 (EP) .

OTHER PUBLICATIONS

Lu, W.–K.,R. Elsenbaumer, B. Wessling, "Corrosion Protection of Mild Steel by Coatings Containing Polyaniline", *Synth. Met.*, vol. 71, pp. 2163–2166 (1995).

Wessling, B., "First Organic Metal Ready for Market—New Anti–Corrosion Method Using Novel Metallic Plastic," *Ahrensburg Press Release*, 3 pages downloaded from Internet Site: http://www.ormecon.de/News/Korros–e, Sep. 14, 1994.

* cited by examiner

*Primary Examiner*—James J. Seidleck
*Assistant Examiner*—Sanza L. McClendon
(74) *Attorney, Agent, or Firm*—Kilpatrick Stockton LLP

(57) ABSTRACT

The present invention relates to novel compositions and methods for preventing corrosion.

11 Claims, No Drawings

METHOD AND COMPOSITION FOR PREVENTING CORROSION

CROSS REFERENCE TO RELATED APPLICATION

This application claims priority to U.S. Provisional Patent Application No. 60/072,625 filed Jan. 26, 1998.

TECHNICAL FIELD

The present invention relates to novel polymeric compositions and methods of applying these compositions for preventing corrosion.

BACKGROUND OF THE INVENTION

The cost of corrosion to the United States is conservatively estimated at $300 billion each year. In addition to the tremendous cost in dollars, corrosion causes catastrophic events that have led to loss of human life through collapse of structures such as bridges. Tens of millions of dollars are invested each year into research for solutions to this problem. This research has only produced technologies that delay the onset of corrosion. The problem of preventing corrosion remains largely unsolved.

Current anti-corrosion products are predominantly various types of polymeric coatings, rust inhibitory chemicals embedded in an overcoat, and recently various alloys that slow the onset of corrosion. Current coatings and overcoats suffer from many problems including imperfect application, non-uniform material, insufficient adhesion, and environmental deterioration. Alloys are expensive and environmentally-sensitive, which affects the choice of for a particular application.

The automobile industry has attempted to find a successful anti-corrosion application, as cost to this industry accounts for one-third of total corrosion costs in the United States. Repairs for corrosion damage to federal bridges in the United States alone cost $50 billion annually and more than half of these bridges require major work due to corrosion. Estimates place the overall worldwide cost to repair reinforced concrete structures at $200 per square meter of exposed surface area. The aircraft and shipbuilding industries are also significantly affected by corrosion. Billions of dollars could be saved with an effective anti-corrosion technology.

Corrosion is an electrochemical process defined as the destructive attack of a metal by the environment. Factors causing corrosion include oxygen concentrations in the water and the atmosphere, hydrogen sulfide, acid rain, temperature, surface texture of metals, concentrations of various salts in solution or in the air, pH of the environment, microorganisms, and biological and industrial contaminants. These factors affect corrosion in the following ways.

The presence of water mixed with contaminants is the basis of galvanic corrosion. Pure rain water is slightly acidic (pH 5.5 to 6.0). It mixes with carbon dioxide and creates carbonic acid. Carbonic acid can attack some metals, including copper. The ions etched from the copper go into solution in the rain water. This leaves the bare steel to oxidize. Metals are subject to solution pressure when immersed in solutions of their metallic salts. Metals may be arranged in order of their solution pressure. When two metals are exposed to water, one may become anodic, suffer corrosion and affect the other metal by rendering it cathodic.

Oxygen is the main accelerator of corrosion. Rainwater picks up oxygen as it falls through the atmosphere. Fresh and salt water are excellent carriers of oxygen. Both bacteria and fungi can deteriorate metal. They produce acids that etch metals, and also produce acids from their decomposition.

There are different types of corrosion: galvanic cells in which corrosion operates between two dissimilar metals; salt concentration cells which are common where metal is in contact with two concentrations of the same salt; and oxygen concentration cells which are differential aeration cells in which corrosion is accelerated at the low oxygen concentration site by an electrochemical process because the high concentration site is cathodic. This is primarily due to the fact that negative free energy of formation of a metal oxide indicates a tendency for the metal to react, therefore the oxide is unstable, but positive free energy indicates that the metal is stable.

Corrosion may be divided into the following categories: 1) Uniform Etch—A direct chemical attack from salts and acids. If this is allowed to continue, a polished surface will dull and then present a rough or frosted appearance; 2) Pitting—Tiny pin holes from localized chemical or galvanic attack; 3) Intergranular—Usually galvanic, this is a selective attack along the grain boundaries of an alloy metal. We have referred to this as “de-alloying”. Intergranular corrosion is a form of stress-corrosion cracking which is the spontaneous failure of metal or alloy as a result of the combined action of stress and corrosion. Stress-corrosion cracking produces two types of failure which can be classified as intergranular and transgranular cracking. Intergranular failure occurs when the cohesion between the crystallographic grains of the metal is reduced appreciably by chemical attack and cracking follows predominantly the grain boundaries. Transgranular failure results when cleavage of the grains occurs. Typical corrosion-resistant alloys can break down when corrosion works on the individual components of the alloy; 4) Exfoliation is localized subsurface corrosion in zones parallel to the surface which result in thin layers of uncorroded metal. Found on extruded metals, this corrosion occurs just below the metal surface and causes a blister to form. This blister appears where the extruding dies have forced the crystal structure of the metal to change direction; 5) Galvanic—The classic two dissimilar metal connection with a water electrolyte bridge is the most basic of corrosion problems; 6) Concentration Cell—As the amount of oxygen reaching the electrolyte varies, the rate of corrosion will vary accordingly. Highly concentrated areas of oxygen will display high levels of corrosion; 7) Stress—More corrosion will occur where high tensile stress is applied. This stress occurs where metal is bent or where rivets have been driven. Metals, such as copper, that have been cold worked (bent back and forth several times) should be annealed (stress relieved by heating). Stress corrosion appears as a cracks running parallel to the metal grain boundaries; 8) Fatigue—Fatigue is another form of stress corrosion where pits are defined along the grain. Additional stress begins to concentrate around them and cracking occurs at the bottom of the pits; and 9) Filiform—Thread-like filament corrosion occurrs under painted surfaces where water and oxygen have penetrated and formed a corrosion concentration cell.

Current polymeric coatings have not adequately addressed the problem of corrosion. Conditions at cathodic areas become alkaline, necessitating that protective paints have good alkali resistance. The resistance of a paint film is affected by the presence of electrolytes in the film, and hence water-soluble impurities in pigments must be kept to a minimum. The presence of electrolytes beneath the film mandates surface cleanliness prior to paint application. Penetration of the film by water and electrolytes from the outside requires highly cross-linked films to become more resistant in general to such penetrations. On the basis of these considerations, it is clear that the essential requirements for protective paint coatings are that they should be applied to a clean metal surface, they should provide a high electrical resistance between the metal and its environment, and they should withstand alkaline conditions.

Recently, conductive plastics have been examined by various industries. Plastics do not generally corrode in the same manner as metals. This is primarily based on the fact that the coatings act as oxidation-reduction (redox) chemicals that approach those of noble metals, therefore inhibiting corrosion.

Inhibitors are chemical substances that, when added in small amounts to the environment in which the metal would corrode, will retard or entirely prevent this corrosion. However, an inhibitor must be absorbed or bonded to the metal surface for it to be effective. The type of bond absorption varies with the chemical configuration of the inhibitor molecule. Other problems faced when using inhibitors include their instability in air and the rapid decomposition of the polymer. Some active species from the environment can be absorbed into the plastic to swell or react internally with the polymer chains. Softening and distortion normally develop, although actual loss of weight from the plastic can occur. In addition, the high cost of production of inhibitors also creates the need to investigate alternative options.

Alloys have been used extensively but are expensive and hazardous to the environment. Current chromium electroplating methods will become illegal and virtually eliminated by the year 2000. Numerous federal, state, and local regulations have been established because of the large quantity of potentially toxic chemicals used in this process. These regulations will force over 11,000 metal finishing companies to find alternative methods that provide similar properties as offered by chromium.

Oxidation of the molecules in plastic can occur in the atmosphere or other oxidizing conditions. This often results in hardening and cracking of the plastic. In addition, continued polymerization of the resin can occur with certain resinous components resulting in hardening, shrinkage, and cracking of the material.

The important aspect of the corrosion mechanisms in plastics lies in the fact that degradation of plastic is not a surface effect like metallic corrosion, but occurs internally. A plastic material may absorb parts per million (ppm) of an aggressive agent from an otherwise innocuous source and potentially result in a total loss of mechanical properties.

Accordingly, what is needed are compositions and methods for preventing corrosion.

What is also needed are compositions and methods for preventing corrosion that are inexpensive.

What is also needed are compositions and methods for preventing corrosion that minimize the use of volatile organic compounds (VOCs).

SUMMARY OF THE INVENTION

Current anti-corrosion technologies only retard the chemical reaction that results in corrosion, whereas the present invention prevents the initial chemical reaction from occurring by actually changing the surface of the material. The present invention addresses problems described above by providing novel compositions and methods for preventing corrosion. The present invention provides anti-corrosive bondings that may be applied efficiently and inexpensively. The present technology differs from prior art processes since the methods of the present invention change the surface of the material to be protected.

The present invention solves problems inherent in previous work in this area by providing methods whereby either microwave radiation is used to activate the surface of metals or electrochemical processing is used to graft polypyrrole onto the surface. Next, polyester based resins are co-grafted or bonded onto the microwave-activated or polypyrrole surface. This is to be distinguished from a coating which is simply applied to the surface. This compounding of a first bond of polypyrrole and second bond of polyester resin provides anti-corrosive properties.

The present invention also solves the problems inherent in the prior art by providing a novel method involving electroplating for imparting anti-corrosive properties.

The potential applications for this technology are numerous: the steel and non-ferrous industries, metallic structures, automobile bodies and chassis, tools, farm equipment, needles, hinges, bridges, steel cables, railways, cylinders, tanks, pipes, grates, construction materials, and wood treatments to name a few.

Advantages of the use of the present technology are numerous. First, these methods are effective to inhibit corrosion and are not based on the use of paint, metal, or metal alloys to provide anti-corrosive properties. Second, the practice of these methods is extremely inexpensive in comparison to electroplating with alloys or metals. These methods are very easy to use and anti-corrosive bondings may be applied in an simple and inexpensive manner. Third, the use of volatile organic compounds (VOCs) are minimized in the practice of the present invention, thereby decreasing the deleterious effects of exposure to VOCs to humans and to the environment.

This technology is useful for a wide variety of applications. Particularly prominent is the use of this technology in an assembly line situation for the manufacture and assembly of metal parts used in the automotive industry. This technology is especially advantageous for application of anti-corrosive grafts to evaporators and air conditioning systems. The chemical industry would also benefit significantly from the use of these anti-corrosive bondings, especially in chemical plants, pipelines and in storage vessels. Industries that operate near or in marine environments would benefit from the anti-corrosive treatments of the present invention. The present invention is also useful in the heavy construction industry in applications such as bridges, especially in cables used in bridges which are subject to oxidation due to environmental causes, and also in tunnels, buildings, superstructures. Finally, footings or metal wires encased in concrete, which are exposed to air within the concrete, may be protected through the use of these anti-corrosive bondings.

A variety of metals may be protected with the anti-corrosive treatments of the present invention. These metals include, but are not limited to steel, mild steel, carbon steel, stainless steel, non-ferrous metals, aluminum, copper, zinc and bronze.

Accordingly, an object of the present invention is to provide compositions and methods to prevent corrosion.

Another object of the present invention is to provide compositions and methods to prevent corrosion of metal.

A specific object of the present invention is to provide compositions and methods to prevent corrosion of air conditioning ducts, evaporators and related equipment.

An advantage of the present invention is that volatile organic compounds (VOCs) are minimized in the practice of the present invention.

Another advantage of the present invention is that these methods and compositions are effective to inhibit corrosion and are not based on the use of paint, metal or metal alloys to provide anti-corrosive properties.

Yet another advantage of the present invention is that the anti-corrosive coatings and methods may be applied in an simple and inexpensive manner.

These and other objects, features and advantages of the present invention will become apparent from the following detailed description.

DETAILED DESCRIPTION OF THE INVENTION

Previous investigators have attempted to use polyaniline in a solution base and then add this polyaniline to a paint to prevent oxidation. These attempts have not been successful since polyaniline dissolved in a solvent often permanently oxidizes in an irreversible manner. Therefore, the prior art is fraught with problems of dissolving polyaniline in a solvent, adding it to a host matrix and retaining its characteristics as a semi-conductive coating.

The present invention provides compositions and methods to prevent corrosion.

In its broadest respects, the present invention is a method of preventing corrosion.

An important aspect of the present invention is the prevention of corrosion of metal.

In one embodiment of the present invention, the surface of the metals is intrinsically modified so as to produce an active moiety of metal hydroxides. Upon this substrate of metal hydroxides, a unique, fully cross-linked polymer is grown to various thicknesses. The technology can be applied in two different processes:

1) Electroplating: In this process, the surfaces are first activated chemically or by using the microwave process. A copolymer is then grafted on the surface to the desired specific thickness; and 2) Microwave process: This process uses a microwave initiator that activates the surface of the metal as described above and subsequently initiates the polymerization using free radical chemistry.

The final polymer is thermally cured after either the electroplating or microwave process.

Before beginning either anti-corrosive procedure of the present invention, metal objects are cleaned in any suitable solvent including, but not limited to solvents such as acetone, heptane, alcohols including isopropanol, oxalic acid, citric acid, or combinations thereof.

Method for Electroplating Metal to Provide Anti-Corrosive Properties

This method is a two step process for electroplating an anti-corrosive surface on metals and metallic objects. A variety of metals including but not limited to steel, mild steel, carbon steel, stainless steel, non-ferrous metals, aluminum, copper, zinc and bronze.

Application of the First Graft

Metal objects are cleaned with a suitable solvent such as acetone, heptane, alcohol, oxalic acid, citric acid, or combinations thereof. The objects are then soaked in an oxidizing agent including but not limited to copper perchlorate, hydrochloric acid, potassium trifluoroborate, lithium perchlorate, chlorate, or bromate, at dilutions of from about 0.1% to 10% for durations of from approximately 1 to 60 minutes. Next, the objects are connected to the cathode of a power supply and lowered into a polymer solution maintained in a stainless steel container or another container which may act as an anode when connected to the anode of the power supply.

The polymer solution consists of about 26 to 34 ml of distilled water, about 2 to 4 ml of acetonitrile (ACN 100% distilled), approximately 0.7 to 1.3 ml of a 1M solution of aluminum sulfate ($Al_2SO_4$), and about 1.6 to 2.4 ml of distilled pyrrole. The objects are exposed to a constant voltage of about from about 0.75 V to 2 V, preferably 0.85 V for a period of about 30 to 45 minutes, while stirring the polymer solution, optionally using a stir bar.

This procedure produces metallic objects with an electroplated bond of sulfated polypyrrole. Prolonged exposure to the selected voltage increases the thickness of the bond applied to the metal object. In general, as the higher voltages within this range are applied, the duration of application is decreased to produce a desired thickness of sulfated polypyrrole. This sulfated polypyrrole is sufficient to inhibit corrosion. Next, polyester based material is electrically co-grafted onto this polypyrrole surface. The underlying polypyrrole layer is conductive, however, the surface layer acts as an insulator to the deleterious effects of temperature, oxygen and other corrosive agents, thereby preserving the underlying polypyrrole sulfate layer. It is to be understood that moieties other than sulfated polypyrrole may be grown on the activated sites on the surface of the metal, for example, ammonium nitrate or sulfone nitrate.

Application of the Second Graft

The electroplated metallic object from the preceding step is next placed on a cathode and lowered into an anti-corrosive solution. The anti-corrosive solution consists of the following: about 43 to 58 ml of distilled water; approximately 1.7 to 2.3 ml distilled pyrrole, and about 1.7 to 2.3 ml of a solution of (10% (weight/weight) polyester (PE) resin in polyethylene glycol 400 (PEG 400); 5% by weight of low molecular weight polystyrene; 1% by weight of N,N-dimethylaniline); and about 0.8 to 1.2 ml of $CuClO_4$ (0.001%). Styrene (5% by weight) may be substituted for low molecular weight polystyrene in this anti-corrosive solution.

The low molecular weight polystyrene used herein is made by mixing the following: between about 0.01 to 0.3 g, preferably 0.03 g of 2,2'-azobisisobutyronitrile (AIBN) is added to about 100 g of styrene; followed by addition of about 0.5 to 1.5 g, preferably 0.5 g of cobalt II naphthanate. This mixture is heated to a temperature of approximately 80° C., at which point between about 0.4 to 1.5 g, preferably 0.8 g of a 50:50 (w/w) mixture of 2-picoline and ethanol is added. This mixture is heated to a temperature of approximately 80° C. for 10 minutes. Next, about 3 to 5 ml of 1M hydrochloric acid is added to stop polymerization.

The object is exposed to a constant voltage of from about 0.7 to 10 V, preferably 1.0 to 7 V for a period of about 1 minute to several hours, preferably 2 minutes to 2 hours. The anode of the power supply is connected to the stainless steel container housing the solution. At the end of this time, the power supply is turned off and about 0.17% to 0.24% (vol/total vol) of $H_2O_2$ (30% stock solution) is added for about 5 minutes. These ranges are not limiting in the practice of the present invention since it is to be understood that the selected voltage and selected period of exposure to the voltage will depend on various parameters such as the surface geometry and area of the object to be bonded. For example, a manifold with a complex geometry and high surface area will require different treatment conditions than a needle or screw.

Modifications

At this point several separate modifications may be made to samples treated with the electroplating procedure as described above. These modifications may produce additionally desired properties, such as increasing the hydrophilicity of the sample. The possible modifications include but are not limited to the following modifications.

Modification 1

After the sample is electroplated and the first graft is formed, the sample may be dipped in a bonding solution consisting of about 4.5% to 6% by weight of a polyethylene glycol/polyester solution (10% polyester in polyethylene glycol 200 in dimethylsulfoxide (DMSO). For some applications, other polyethylene glycols such as polyethylene glycol 400, polyethylene glycol 600, or polyethylene glycol 800, may be employed in this and other modifications listed below. It is to be understood that vacuum may be optionally employed during the curing step in this and other modifications listed below. The sample is bonded twice and cured in an oven at a temperature of about 1000° C. to 2000° C., preferably about 130° C. for about 1 to 2 hours for each bond.

Modification 2

In a different procedure, after test samples are electroplated and the first graft is formed, the samples are dipped in a bonding solution consisting of a polyethylene glycol/polyester solution (10% polyester in polyethylene glycol 200) without DMSO. The sample is bonded twice and cured in an oven at about 100° C. to 200° C., preferably about 130° C. for about 1 to 2 hours for each bond.

Modification 3

One modification to the samples bonded with polyethylene glycol/polyester solution in DMSO is the simultaneous addition of about 8% to 12% by weight of ethylhydroxyethyl cellulose (BERMOCOLL), or from about 1% to 20% of a 0.25% solution of carboxymethylcellulose in $H_2O$, in the entire mixture of PE/PEG in DMSO to enhance hydrophilicity.

Modification 4

Another modification to the samples bonded with polyethylene glycol/polyester solution without DMSO is the simultaneous addition of about 8% to 12% by weight of ethylhydroxyethyl cellulose (BERMOCOLL), or from approximately 1% to 20% of a 0.25% solution of carboxymethylcellulose in $H_2O$, in the entire mixture of PE/PEG to enhance hydrophilicity.

Modification 5

After the sample is electroplated and the first graft is formed, the sample is dipped in polyurethane (water-based or oil-based polyurethane) and cured at about 100° C. to 200° C., preferably about 160° C. for approximately 15 to 30 minutes.

Modification 6

After the sample is electroplated and the first graft is formed, the sample is dipped in a mixture of about 20% (w/w) of 4,4'-methylenebis(phenylisocyanate) (MDI) in polyethylene glycol 400. Solutions of from about 5% to 30% MDI may be employed. This mixture is made by heating the MDI in polyethylene glycol 400 until it is a clear mixture. The sample is then cured at about 150° C. to 250 C., preferably about 225° C., for approximately one to two hours.

Other diols or diisocyanates may be employed in modification 6 and in the additional modifications listed below instead of polyethylene glycol and MDI, respectively. Other diols include, but are not limited to, propylene glycol, ethylene glycol, or any dihydric alcohol as well as alcohol mixtures, and polyoxyethylene-polyoxypropylene block copolymers. Other diisocyanates include, but are not limited to, toluene diisocyanate.

Modification 7

After the sample is electroplated and the first graft is formed, the sample is dipped in a mixture of about 20% (w/w) of MDI in polyethylene glycol 400. Solutions of from about 5% to 30% MDI may be employed. The mixture is made by heating the MDI in polyethylene glycol 400 until it is a clear mixture. To this solution of polyethylene glycol 400 and MDI is added from about 1% to 10% (w/w) of polyethylene glycol 400 dimethacrylate. The sample is then cured at about 150° C. to 250° C., preferably about 225° C. for approximately one to two hours.

Modification 8

After the sample is electroplated and the first graft is formed, the sample is dipped in a mixture of about 15% (w/w) of MDI in polyethylene glycol 200. Solutions of from about 5% to 30% MDI may be employed. This mixture is made by heating the MDI in polyethylene glycol 200 until it is a clear mixture. The sample is then cured at about 150° C. to 250 C., preferably about 225° C., for approximately one to two hours.

Modification 9

After the sample is electroplated and the first graft is formed, the sample is dipped in a mixture of about 15% (w/w) of MDI in polyethylene glycol 200. Solutions of from about 5% to 30% MDI may be employed. This mixture is made by heating the MDI in polyethylene glycol 200 until it is a clear mixture. To this solution of polyethylene glycol 200 and MDI is added from about 1% to 10% (w/w) of a mixture of polyethylene glycol 400 dimethacrylate (1% to 10%). The polyethylene glycol 400 dimethacrylate may be a mixture of from about 1% to 10%. The sample is then cured at about 150° C. to 250° C., preferably about 225 C. for approximately one to two hours.

Modification 10

After the sample is electroplated and the first graft is formed, the sample is dipped in a mixture of about 15% (wlw) of MDI in polyethylene glycol 200. Solutions of from about 5% to 30 1000% MDI may be employed. This mixture is made by heating the MDI in polyethylene glycol 200 until it is a clear mixture. To this solution of polyethylene glycol 200 and MDI is added from about 1% to 10% (w/w) of a mixture of polyethylene glycol 400 dimethacrylate (1% to 10%). Next, about 1% to 10% by weight of a silica-ethylene glycol mixture (Nissan Chemical Co., Japan) is added. The sample is then cured at about 150° C. to 250° C., preferably about 225° C. for approximately one to two hours.

Modification 11

After the sample is electroplated and the first graft is formed, the sample is dipped in a mixture of about 15% (w/w) of MDI in polyethylene glycol 200. Solutions of from about 5% to 30% MDI may be employed. This mixture is made by heating the MDI in polyethylene glycol 200 until it is a clear mixture. Next, about 1% to 10% by weight of pentaerythritol tetraacrylate is added. The sample is then cured at about 150° C. to 250° C., preferably about 225° C. for approximately one to two hours.

Modification 12

After the sample is electroplated and the first graft is formed, the sample is dipped in a mixture of about 10 g polyurethane (Poly-finish ACE 16003 Ace Hardware) in approximately 2.5 g $H_2O$. The sample is dried in the oven for a period of about 10 to 60 minutes, preferably 20 to 50 minutes, most preferably 30 minutes, at a temperatures from between approximately 60° C. and 180° C., preferably 130° C. The sample is then dipped in a mixture of approximately 10 g polyurethane, about 2.5 g $H_2O$, and about 12.5 g of a mixture of 5% polyvinylpyrrolidinone (PVP—Aldrich Catalog No. 85,647) in $H_2O$. The sample is dried in the oven for a period of from about 10 minutes to 2 hours, at a temperature of about 60° C. and 180° C., preferably about 130° C. for a period of about 60 minutes. This modification produces samples that are hydrophilic and possess anti-corrosive properties.

Microwave Method for Treating Metal to Provide Anti-Corrosive Properties

Metal objects are cleaned by sonication with a suitable solvent such as acetone, heptane, alcohol such as isopropanol, oxalic acid, citric acid, or combinations thereof. Next, samples are immersed in solution K and microwaved for about 4 to 10 intervals, preferably 6 intervals, of about 8 to 12 seconds per interval, preferably 10 seconds per interval. It is to be understood in that in the practice of the present invention, different wattages of microwave radiation may be used for various durations depending on the surface area and geometry of the metallic object to be bonded. In general terms, as the power of the applied microwave radiation increases, the duration of exposure decreases. A typical home microwave unit of about 1000 watts maximum power was employed at a setting of 100% power in the examples described herein.

Solution K consists of about 20% of solution J [solution J is 50% microwave initiator 3B (MI-3B):50% acrylic acid] in CYLINK®:methanol (CYLINK:MeOH 1:4)—CYLINK is a resin made from melamine and formaldehyde. CYLINK is a trademark of Cytec Industries, Inc., (West Patterson, N.J.). It is to be understood that other monomers besides acrylic acid may be employed in the formation of solution J. These monomers include, but are not limited to, hydroxyethyl methacrylate, methylmethacrylate, and N-vinylpyrrolidinone. Solution K is made by mixing 2 g of solution J [MI-3B: acrylic acid] with 10 g of CYLINK-:MeOH (1:4). CYLINK:MeOH (1:4) is a solution of CYLINK® in methanol mixed in a ratio of 1 part CYLINK® to 4 parts methanol. Solution J is made by slowly adding distilled acrylic acid to MI-3B in equal amounts.

Micrograft initiator 3B is made by mixing the following reagents:

a. 80 ml polyvinyl alcohol (PVA) solution;

b. 20 ml of low molecular weight polyaniline (PA)/N-methylpyrrolidinone (NMP);

c. 25 ml concentrated $H_2SO_4$;

d. 8 ml ethylene glycol;

e. 6 ml of a saturated solution of $CuClO_4$/tetrahydrofuran (THF); and f. 139 ml $H_2O_2$ (30%)

The samples are then rinsed in distilled water and dip-bonded with a solution consisting of the following ingredients: about 43 to 57 g vinylester resin; about 0.8 to 1.2 g Solution 4 (solution 4 consists of about 1 g carboxymethyl cellulose, 1 g polyacrylic acid, and 100 ml $H_2O$), approximately 4.3 to 5.7 g methylmethacrylate; polyaniline (a saturated solution of polyaniline in an N-methylpyrrolidinone), which contains 1 M p-toluene sulfonic acid monohydrate, is optionally added at an amount of about 0.8 to 1.2 g; about 0.43 to 0.58 ml N,N-dimethylaniline; approximately 0.43 to 0.58 ml cobalt II naphthanate; and approximately 0.43 to 0.58 ml of Solution 2 (solution 2 consists of about 99% methyl ethyl ketone peroxide, and 1% hydrogen peroxide (30% stock solution), final volume percentages are shown).

This solution cures at room temperature in about 10 minutes. In different tests, several different amounts of the initiator described in Solution 2 were added to the solution resulting in a range of cure times from seconds to minutes. In general, as the amount of initiator employed increased, the cure time decreased.

Antimicrobial properties are imparted to this surface modified aluminum by adding between approximately 3% and 5% of a solution called INTERCEPT(Interface Research, Kennesaw, Ga.). INTERCEPT is a broad spectrum biostat which is a blend of substituted ammonium salts of alkylated phosphoric acids mixed with free alkylated phosphoric acid. Alternatively, antimicrobial properties are imparted to the surface bonded aluminum by exposing the aluminum to a solution comprised of from about 43% to 57% BERMOCOLL™ (0.7% solution) and about 43% to 57% INTERCEPT(Interface Research, Kennesaw, Ga.). AIRSEPT is a bottled liquid chemical biostat treatment used to eliminate mold and mildew. This solution is then cured at approximately 130° C. for a period of from about 30 minutes to 1 hour.

Samples modified with the procedure of this example show increased resistance to corrosive conditions when compared to unmodified samples and also compared to aluminum objects with commercially available anti-corrosive coatings. When aluminum objects of bare aluminum and also objects coated with AIRSEPT (Interface Research, Kennesaw, Ga.) were placed in a solution of 1 M HCl for a 24 hour period, they dissolved. In contrast, aluminum objects treated as described in the present invention demonstrated only slight corrosion located around some areas where the anti-corrosive coating may have been deficient as a result of hand dipping the objects. Objects modified with the present invention also demonstrated a very thin, inflexible, anti-corrosive coating.

An added advantage of using polyester resin dissolved in polyethylene glycol 400 is that VOCs such as styrene and acrylate are avoided. However, it is to be understood that in the practice of the present invention styrene or acrylate based solvents could be used to dissolve polyester.

Results indicate that these bondings are stable to exposure to strong acids such as 5 M HCl at room temperature for about 5 minutes. After such a caustic exposure, the treated metal was unaffected. The thicknesses of the resulting bondings are between approximately 0.1 $\mu$m to 0.5 $\mu$m.

Corrosion Tests

A variety of corrosion tests, known to one of ordinary skill in the art, may be applied to test the properties of the samples modified with the procedures of the present invention. These tests may include exposure to acidic or salt/acid solutions of various strengths for different periods (SWAAT test ASTMG 85–94).

The present invention may be used to prevent oxidation of many objects, including but not limited to the following: motor vehicle bodies, frames, chassis and other parts used in motor vehicles; aircraft and their parts; nautical vessels and their parts; nautical equipment; farm equipment; medical equipment, needles, medical prostheses and implants; oil drilling equipment; wood; door hinges; air conditioners; air conditioner evaporators; bridges; cables; fences; tools; metal railings; buildings; machine parts; steel cables; twisted steel cables; gears; cylinders; tanks; pipes; railways; and equipment and parts used in the aeronautical and aerospace industries.

The present invention is further illustrated by the following examples, which are not to be construed in any way as imposing limitations upon the scope of the present invention. On the contrary, it is to be clearly understood that resort may be had to various other embodiments, modifications, and equivalents thereof, which, after reading the description herein, may suggest themselves to those skilled in the art without departing from the spirit of the present invention. For example, it is to be clearly understood that minor modifications in the concentration of some reagents, in the duration of the reactions, or other changes in reaction conditions are within the scope of the present invention.

EXAMPLE 1

Method for Electroplating Aluminum

The following method is a two step process for electroplating an anti-corrosive surface on metal. The metal employed in this example was aluminum.

First graft

Objects of aluminum were cleaned with acetone. The objects were soaked in $CuClO_4$ (0.001% weight/volume) for durations of from 1 to 60 minutes. Next, the objects were connected to the cathode of the power supply and lowered into a polymer solution maintained in a stainless steel container. The stainless steel container was connected to the anode of the power supply.

The polymer solution consisted of 30 ml of distilled water, 3 ml of acetonitrile (ACN 100% distilled), 1 ml of a 1M solution of aluminum sulfate ($Al_2SO_4$), and 2 ml of distilled pyrrole. The objects were exposed to a constant voltage of about 0.85 V for about 30 to 45 minutes, while stirring the polymer solution with a stir bar. Voltages of from about 0.75 V to 2 V have been applied for periods of about 30 to 45 minutes.

This procedure produced aluminum objects with an electroplated bond of sulfated polypyrrole. Prolonged exposure to the selected voltage increased the thickness of the bond applied to the aluminum object. As the higher voltages within this range were applied, the duration of application was decreased.

Second graft

The electroplated object of aluminum from the preceding step was connected to a cathode and lowered into an anti-corrosive solution. The anti-corrosive solution consisted of the following: 50 ml of distilled water; 2 ml distilled pyrrole and 2 ml of a solution of (10% (weight/weight) polyester (PE) resin in polyethylene glycol 400 (PEG 400); 5% by weight of picoline prepolymerized polystyrene; 1% by weight of N,N-dimethylaniline); and 1 ml of $CuClO_4$ (0.001%).

The sample was exposed to a constant voltage of 1.25 V for 45 minutes. The anode of the power supply was connected to the stainless steel container housing the solution. At the end of this time, the power supply was turned off and about 0.2% (vol/total vol) of $H_2O_2$ (30% stock solution) was added for about 5 minutes.

Modifications

At this point several separate modifications were made on samples treated as described above in this Example.

Modification 1

After the sample was electroplated and the first graft was formed, the sample was dipped in a bonding solution consisting of 5% by weight of a polyethylene glycol/polyester solution (10% polyester in polyethylene glycol 200) in dimethylsulfoxide (DMSO). The sample was bonded twice and cured in an oven at 130° C. for about 1 to 2 hours for each bond. The sample displayed anti-corrosive properties.

Modification 2

In a different procedure, after test samples were electroplated and the first graft was formed, the samples were dipped in a bonding solution consisting of a polyethylene glycol/polyester solution (10% polyester in polyethylene glycol 200) without DMSO. The sample was bonded twice and cured in an oven at 130° C. for about 1 to 2 hours for each bond. The sample displayed anti-corrosive properties.

Modification 3

One modification to the samples bonded with polyethylene glycol/polyester solution in DMSO was the simultaneous addition of about 10% by weight of ethylhydroxyethyl cellulose (BERMOCOLL) or 10% of a solution of carboxymethylcellulose (0.25% CMC in $H_2O$) to the entire mixture of PE/PEG in DMSO to enhance hydrophilicity. The sample displayed anti-corrosive and hydrophilic properties.

Modification 4

Another modification to the samples bonded with polyethylene glycol/polyester solution without DMSO was the simultaneous addition of about 10% by weight of ethylhydroxyethyl cellulose (BERMOCOLL) or 10% of a solution of carboxymethylcellulose (0.25% CMC in $H_2O$) to the entire mixture of PE/PEG to enhance hydrophilicity. The sample displayed anti-corrosive and hydrophilic properties.

Modification 5

After the sample was electroplated and the first graft was formed, the sample was dipped in polyurethane and cured at about 160° C. for 15 to 30 minutes. The sample displayed anti-corrosive properties.

Modification 6

After the sample was electroplated and the first graft was formed, the sample was dipped in a mixture of about 20% (w/w) of MDI in polyethylene glycol 400. This mixture was made by heating the MDI in polyethylene glycol 400 until it was a clear mixture. The sample was cured at about 225° C. for approximately 1 to 2 hours. The sample displayed anti-corrosive properties.

Modification 7

After the sample was electroplated and the first graft was formed, the sample was dipped in a mixture of about 20% (w/w) of MDI in polyethylene glycol 400. The mixture was made by heating the MDI in polyethylene glycol 400 until it was a clear mixture. Next, about 10% (w/w) of polyethylene glycol 400 dimethacrylate was added. The sample was cured at about 225° C. C for approximately 1 to 2 hours. The sample displayed anti-corrosive properties.

Modification 8

After the sample was electroplated and the first graft was formed, the sample was dipped in a mixture of about 15% (w/w) of MDI in polyethylene glycol 200. This mixture was made by heating the MDI in polyethylene glycol 200 until it was a clear mixture. The sample was cured at about 225° C. for approximately 1 to 2 hours. The sample displayed anti-corrosive properties.

Modification 9

After the sample was electroplated and the first graft was formed, the sample was dipped in a mixture of about 15% (w/w) of MDI in polyethylene glycol 200. The mixture was made by heating the MDI in polyethylene glycol 200 until it was a clear mixture. To this mixture was added about 10% (w/w) of a mixture of polyethylene glycol 400 dimethacrylate (1% to 10%). The sample was then cured at about 225°

C. for approximately 1 to 2 hours. The sample displayed anti-corrosive properties.

Modification 10

After the sample was electroplated and the first graft was formed, the sample was dipped in a mixture of about 15% (w/w) of MDI in polyethylene glycol 200. The mixture was made by heating the MDI in polyethylene glycol 200 until it was a clear mixture. Next, about 10% (w/w) of a mixture of polyethylene glycol 400 dimethacrylate (1% to 10%) was added. Next, about 10% by weight of a silica-ethylene glycol mixture (Nissan Chemical Co., Japan) was added. The sample was then cured at about 225° C. for approximately 1 to 2 hours. The sample displayed anticorrosive and hydrophilic properties.

Modification 11

After the sample was electroplated and the first graft was formed, the sample was dipped in a mixture of about 15% (w/w) of MDI in polyethylene glycol 200. This mixture was made by heating the MDI in polyethylene glycol 200 until it was a clear mixture. Next, about 10% by weight of pentaerythritol tetraacrylate was added. The sample was then cured at about 225° C. for approximately 1 to 2 hours. The sample displayed anti-corrosive properties Modification 12

After the sample was electroplated and the first graft was formed, the sample was dipped in a mixture of about 10 g polyurethane (Poly-finish ACE 16003 Ace Hardware) and 2.5 g $H_2O$. The sample was dried in the oven for a period of about 15 minutes, at about 130° C. The sample was then dipped in a mixture of approximately 10 g polyurethane, about 2.5 g $H_2O$, and about 12.5 g of a mixture of 5% polyvinylpyrrolidinone (PVP—Aldrich Catalog No. 85,647) in $H_2O$. The sample was dried in the oven for about 60 minutes at a temperature of about 130° C. This modification produced samples that were hydrophilic and possessed anti-corrosive properties.

EXAMPLE 2

Anti-Corrosive Surface Modification of Aluminum

Aluminum samples were cleaned by sonication for 10 minutes sequentially in each of the following solutions: heptane, acetone, isopropanol. Next, samples were immersed in solution K and microwaved for 6 intervals of about 10 seconds per interval.

Solution K consisted of 20% of solution J [50% mircro-wave initiator 3B (MI-3B):50% acrylic acid] in CYLINK®:methanol (CYLINK:MeOH 1:4). Solution K was made by mixing 2 g of solution J [MI-3B:acrylic acid] with 10 g of CYLINK:MeOH (1:4). CYLINK:MeOH (1:4) was a solution of CYLINK® in methanol mixed in a ratio of 1 part CYLINK® to 4 parts methanol. CYLINK is a resin made from melamine and formaldehyde. CYLINK is a trademark of Cytec Industries, Inc., (West Patterson, N.J.).

Solution J was made by slowly adding distilled acrylic acid to MI-3B in equal amounts.

Micrograft initiator 3B was made by mixing the following reagents:

a. 80 ml polyvinyl alcohol (PVA) solution [10% vol:vol PVA in $H_2O$];

b. 20 ml polyaniline (PA) low molecular weight)/N-methylpyrrolidinone (NMP) [0.7 g PA in 43 ml NMP];

c. 25 ml concentrated $H_2SO_4$;

d. 8 ml ethylene glycol;

e. 6 ml of a saturated solution of $CuClO_4$/tetrahydrofuran (THF); and f. 139 ml $H_2O_2$ (30%)

The samples were then rinsed in distilled water and dip-bonded with a solution consisting of the following ingredients: 50 g vinylester resin; 0.5 g Solution 4 (solution 4 consisted of 0.5 g carboxymethyl cellulose, 1 g polyacrylic acid, and 100 ml $H_2O$), 5 g methylmethacrylate; polyaniline (a saturated solution of polyaniline in an N-methylpyrrolidinone) which contained 1 molar p-toluene sulfonic acid monohydrate was optionally added at an amount of 1 g; 0.5 ml N,N-dimethylaniline; 0.5 ml cobalt II naphthanate; 0.5 ml of Solution 2 (solution 2 consisted of 99% methyl ethyl ketone peroxide, and 1% hydrogen peroxide (30% stock solution) final volume percentages are shown).

This solution cured at room temperature in about 10 minutes. In different tests, several different amounts of the initiator described in Solution 2 were added to the solution resulting in a range of cure times from about 10 seconds to 10 minutes.

Antimicrobial properties were imparted to this surface modified aluminum by adding between approximately 3% and 5% of a solution called INTERCEPT-(Interface Research, Kennesaw, Ga.). INTERCEPT is a broad spectrum biostat which is a blend of substituted ammonium salts of alkylated phosphoric acids mixed with free alkylated phosphoric acid. Alternatively, antimicrobial properties were imparted to the surface bonded aluminum by exposing the aluminum to a solution comprised of 50% BERMOCOLL™ (0.7% solution) and 50% AIRSEPT (Interface Research, Kennesaw, Ga.). AIRSEPT is a bottled liquid chemical biostat treatment used to eliminate mold and mildew. This solution was then cured at approximately 130° C. for a period of from about 30 minutes to 1 hour.

Samples modified with the procedure of this example showed increased resistance to corrosive conditions when compared to unmodified aluminum and also compared to aluminum objects with commercially available anti-corrosive coatings. When objects were placed in a solution of 1 M HCl for a 24 hour period, objects of bare aluminum and objects coated with AIRSEPT (Interface Research, Kennesaw, Ga.) completely dissolved. In contrast, aluminum objects treated as described in the present invention demonstrated only slight corrosion located around some edges where the anti-corrosive coating may have been deficient as a result of hand dipping the objects. Objects modified with the present invention also demonstrated a very thin, inflexible, anti-corrosive coating.

Accelerated Corrosion Test

Modified samples from both the electroplating and microwave procedures described in Examples 1 and 2 were placed in 1 M HCl for 24 hours. Following this acid exposure, aluminum objects bonded with the method of Example 1 showed no corrosion, whereas unmodified aluminum objects disintegrated and became a powder in the HCl solution. Objects coated with one of the best anti-corrosive technologies (chromium electroplating) currently on the market were also placed in 1 M HCl and showed a high degree of corrosion after 24 hours.

Salt/Acid Test (Limited SWAAT test ASTMG 85–94 applied for 96 hours)

Modified samples from both the electroplating and microwave procedures described in Examples 1 and 2 were placed in the following solution: 5 g NaCl; 1 ml glacial acetic acid; 100 ml distilled water for 96 hours. Modified samples from Examples 1 and 2 exposed to this solution for 96 hours showed no evidence of corrosion. In contrast, unmodified aluminum samples that were exposed to this solution exhibited signs of corrosion precipitation.

It should be understood, of course, that the foregoing relates only to preferred embodiments of the present invention and that numerous modifications or alterations may be made therein without departing from the spirit and the scope of the present invention.

What is claimed is:

1. A method of protecting a surface from corrosion comprising:

a) coating the surface in a solution comprising a micrograft initiator and a monomer;

b) exposing the surface to microwave radiation; and c) grafting a polyester-based resin to the surface.

2. The method of claim 1, wherein the micrograft initiator comprises:

a first solution of polyvinyl alcohol, ethylene glycol and polyaniline dissolved in N-methyl pyrrolidinone;

a second solution of copper perchlorate; and a third solution comprising addition of the second solution to the first solution, followed by addition of acid and hydrogen peroxide.

3. The method of claim 1, wherein the monomer is selected from the group consisting of acrylic acid, hydroxyethyl methacrylate, methylmethacrylate and N-vinylpyrrolidinone.

4. The method of claim 1, wherein step c) further comprises the steps of:

i) contacting the surface with a bonding solution comprising a polyester based material; and ii) curing the bonding solution on the surface.

5. A method for protecting a surface comprising:

cleaning the surface with a suitable solvent;

immersing the surface in a first solution, wherein the first solution comprises a second solution of melamine and formaldehyde in methanol, wherein the second solution comprises a monomer and a micrograft initiator, wherein the micrograft initiator comprises polyvinyl alcohol, polyaniline in N-methylpyrrolidinone, sulfuric acid, ethylene glycol, copper perchlorate in tetrahydrofuran, and hydrogen peroxide;

exposing the surface to microwave radiation;

removing the surface from the microwave solution;

rinsing the surface with water;

dip-bonding the surface in a polymer solution comprising vinylester resin, carboxymethyl cellulose, polyacrylic acid, water, methylmethacrylate, N,N-dimethylaniline, cobalt II naphthanate, methyl ethyl ketone peroxide, and hydrogen peroxide.

6. The method of claim 5, wherein the polymer solution further comprises a polyaniline solution comprising polyaniline and p-toluene sulfonic acid monohydrate in N-methylpyrrolidinone.

7. The method of claim 5, wherein the polymer solution further comprises a biostat.

8. The method of claim 5, wherein after the surface has been dip-bonded in the polymer solution the surface is contacted with a solution comprising ethylhydroxyethyl cellulose and a biostat.

9. The method of claim 7, wherein the biostat is a blend of substituted ammonium salts of alkylated phosphoric acids mixed with free alkylated phosphoric acid.

10. The method of claim 8, wherein the biostat is a liquid chemical biostat treatment used to eliminate mold and mildew.

11. The method of claim 8, further comprising exposure of the surface to a temperature of approximately 130° C. for a period of from about 30 minutes to about 60 minutes.

* * * * *